United States Patent [19]
Zelley et al.

[11] 3,791,860
[45] Feb. 12, 1974

[54] COATED ALUMINUM WELDING ELECTRODE AND FILLER ROD

[75] Inventors: Walter G. Zelley, Lower Burrell; William M. Rogerson, New Kensington, both of Pa.

[73] Assignee: Aluminum Company of America, Pittsburgh, Pa.

[22] Filed: Dec. 27, 1971

[21] Appl. No.: 212,785

[52] U.S. Cl............... 117/202, 117/49, 219/145, 219/146
[51] Int. Cl....... B23k 35/00, B23k 35/22
[58] Field of Search...... 117/202, 206, 49; 219/145, 219/146

[56] References Cited
UNITED STATES PATENTS

| | | | |
|---|---|---|---|
| 3,558,368 | 1/1971 | Zelley | 117/49 |
| 3,256,085 | 6/1966 | Hitchings | 75/58 |
| 2,785,094 | 3/1957 | Garriott | 117/206 |
| 2,697,159 | 12/1954 | Donahey | 338/6 |
| 2,552,105 | 5/1951 | Miller | 148/26 |

*Primary Examiner*—Alfred L. Leavitt
*Assistant Examiner*—M. F. Esposito
*Attorney, Agent, or Firm*—Arnold B. Silverman; John P. Taylor

[57] ABSTRACT

A method of manufacturing a welding electrode or filler rod by cleaning the surface of an aluminum wire rod and applying to the cleaned surface an aqueous solution of an alkali metal silicate having a concentration of greater than 0.5 percent for a period of greater than 5 seconds at a temperature in excess of 140°F in order to establish a thin, oxidation resistant reacted silicate coating on the aluminum surface. Subsequently rinsing and drying the coated aluminum wire or rod. The reacted silicate coating is provided in such a fashion that it has a thickness such that the outermost 1,000 angstroms of the aluminum surface has about 0.10 to 1.25 percent silicon.

An aluminum welding rod or electrode having a thin reacted oxidation barrier coating on the exterior surface thereof. The oxidation barrier coating is such that the outermost 1,000 angstroms of the wire surface contains about 0.10 to 1.25 percent silicon and preferably about 0.50 to 0.80 percent silicon. The oxidation resistant coated surface is characterized by resistance to appreciable crazing and flaking responsive to deformation of the aluminum wire.

13 Claims, No Drawings

COATED ALUMINUM WELDING ELECTRODE AND FILLER ROD

BACKGROUND OF THE INVENTION

1. Field of the Invention

This invention relates to aluminum welding electrodes and aluminum filler rods on the surfaces of which are established oxidation resistant reacted coatings which preserve desirable welding properties even after storage thereof in undesirable environments.

2. Description of the Prior Art

In both inert-gas tungsten-arc welding and inert-gas metal-arc welding numerous problems have been encountered in connection with deterioration of surface characteristics of welding electrodes and filler rods as a result of storage of the same in various types of environments.

In inert-gas tungsten-arc welding a tungsten electrode, which is surrounded by a stream of inert gas confined by a nozzle assembly, is employed. An electrical arc is established between the tungsten electrode and the material to be joined. It is frequently necessary or desirable to employ a filler metal which is introduced in the form of an aluminum rod or wire.

In inert-gas metal-arc welding a consumable aluminum electrode is surrounded by a stream of inert gas confined by a nozzle assembly. An electrical arc is established between the electrode and the material to be joined. Means are provided to advance the electrode at a controlled speed proportionate to the rate at which it is consumed.

In both forms of welding it has been found that the surface condition of the electrodes and filler rods can be critical to the quality of the resultant weld. Undesired surface characteristics such as oxidation and/or the presence of hydrocarbons or other foreign material can produce welding defects such as lack of fusion, weld porosity or other discontinuities in the weld. All of these defects can contribute to failure of the welded joint. In addition, as oxide coatings are basically electrically insulating in nature, resistance to the establishment of an electric arc of the desired intensity can be encountered when using the inert-gas metal-arc welding process. Finally, the presence of an outer layer of oxide on the surface of the electrode or filler rod permits absorption of water which can have a substantial effect in contributing to undesired weld porosity.

It has been known in such arc welding operations to remove oxide from the surface of electrodes and filler rods immediately prior to initiation of the welding operation. See U. S. Pat. No. 3,194,704, for example. Such removal has been effected conveniently either by chemical means or mechanical means. Such a practice complicates the welding operation as it requires the end user of the electrode or filler rod to introduce a preliminary fabricating step prior to the welding operation. In addition, it requires investment in equipment and labor necessary to accomplish the cleaning operation. All of this has been necessitated as a result of the absence of an effective protective coating for welding electrodes and filler rods which will withstand long periods of storage in various environments without permitting the formation of undesired hydrated oxide.

It has been known to apply precipitated coatings to the exterior surface of electrodes and filler rods in an effort to permit storage while resisting undesired oxide. Precipitated coatings are relatively thick and are characterized by a low aluminum content and high silicon, oxygen and alkali metal (where employed) concentrations. See U. S. Pat. Nos. 1,608,775 and 3,256,085. Such approaches, however, have not resulted in a uniform tenaciously bonded coating which will withstand flexing, bending and forming without crazing or flaking. This failure is particularly significant in view of the fact that electrodes and filler rods are conventionally provided in the form of wrapped coils wherein the electrode or rod is deformed during application to the coil, remains in the deformed position during storage and is deformed once again during removal from the coil. An additional disadvantage of this approach, apart from the functional disadvantage, is that an end user conducting a welding operation prefers to see an electrode or filler rod surface characterized by brightness of the cleaned original metal surface, as opposed to a glassy coated surface or a dull oxide surface covering. Finally, the precipitated coatings have been characterized by undesirable relatively high electrical resistance which tends to interfere with the welding operation.

A problem which compounds the storage difficulty is that a given type of welding electrode or filler rod will generally be supplied to a great number of end users in various geographical locations with various climates. As a result, the temperature and humidity of the immediate environment within which the product will be stored will vary greatly. It is a characteristic of oxide coated aluminum electrodes and filler rods that they tend to come to equilibrium with their environment. As a result, in a hot dry area the oxide film will tend to remain relatively unchanged, while in a warm humid area there will be a tendency for growth of the oxide film. These environmentally induced changes present yet another potentially troublesome variable which is directly related to the quantity of the product, the efficiency of the welding operation and the freedom of the resultant weld from undesired defects.

There remains, therefore, a need for a method of providing an aluminum arc welding electrode and aluminum filler material which are capable of being stored for prolonged periods of time under severe environmental conditions while resisting oxide formation of the aluminum surface in an effective fashion. There remains a further need for such a method and the resulting product which possesses resistance to crazing and flaking when subjected to mechanical deformation and provides a tightly bonded uniform continuous coating having relatively low electrical resistance.

SUMMARY OF THE INVENTION

The above-described problems have been solved by the process and resultant product of this invention. The method of this invention involves precleaning the surface of an aluminum wire or rod, which may ultimately be employed as an electrode or filler rod. The cleaned aluminum rod is then subjected to application of an aqueous solution of an alkali metal silicate having a concentration of greater than 0.5 percent for a time period in excess of 5 seconds, at a temperature of about 140° to 212°F, in order to establish an oxidation resistant reaction product silicate coating on the rod surface. The coating is extremely thin and has a thickness such that the outermost 1,000 angstroms of the aluminum surface has at least 0.10 percent silicon and not more than about 1.25 perent silicon. The preferred concentration is about 0.50 to 0.80 percent silicon within the outermost 1,000 angstroms of surface. After establishment of the reaction product coating, the rod is subjected to rinsing and subsequent drying.

Among the preferred alkali metal silicates are sodium silicate, potassium silicate and lithium silicate. The preferred material is sodium silicate having an $SiO_2$ to $Na_2O$ ratio of about 2:1 to 3.75:1.

In the preferred process of treatment the aqueous solution will be applied to the rod by immersion of the rod therein for a period of about 30 seconds to 2 minutes with the solution having a temperature of about 170° to 190°F.

The resultant product has an elongated aluminum body of solid cross sectional configuration with a reacted silicate coating on the exterior thereof such that the outermost 1,000 angstroms of surface contains at least 0.10 percent silicon and preferably about 0.50 to 0.80 percent silicon. The reacted coating is characterized by resistance to oxidation and also resistance to appreciable crazing and flaking responsive to deformation of the aluminum rod.

It is an object of this invention to provide a method of establishing a reaction coating on an aluminum welding electrode or filler rod which coating will be effective in resisting oxidation of the electrode or rod surface even during extended storage under potentially troublesome environmental conditions.

It is another object of this invention to provide such a coated electrode or rod wherein the reaction coating will be uniform, continuous and tenaciously bonded to the aluminum substrate.

It is another object of this invention to provide such an electrode or filler rod with a reacted coating which will eliminate the necessity for chemical or mechanical oxidation removal treatments immediately prior to initiation of arc welding.

It is another object of this invention to provide such a reaction coated product which resists absorption of water, hydrocarbons and other materials which tend to contribute to weld defects such as lack of fushion, porosity and other discontinuities.

It is yet another object of this invention to provide an economical means for establishing the protective reacted silicate coating of this invention which coating provides the product with the natural bright appearance of the aluminum article without deterioration of the same during extended storage under various environmental conditions.

These and other objects of the invention will be more fully understood from the following description of the invention.

DESCRIPTION OF THE PREFERRED EMBODIMENTS

For convenience of reference, the term "welding rod" as used herein shall be employed to refer generically to metal wire or rods employed in a welding operation either as a welding electrode or as a filler rod. The term "aluminum" as used herein shall be employed to refer to any grade of aluminum and aluminum base alloys wherein aluminum consists of not less than 80 percent by weight of the total composition.

The process of this invention is directed toward the establishment of a reaction product coating on the exterior of an aluminum welding rod. As aluminum surfaces, if unprotected, will in most environments tend to be subject to oxidation on exposed surfaces, the initial step in the process of the present invention is that of removing surface oxides as well as oils, greases and other foreign materials. This serves to provide a freshly cleaned exposed aluminum surface and facilitate establishment of the reacted corrosion resistant coating of this invention. This cleaning operation may be accomplished by any convenient means such as solvent cleaning, non-etching chemical cleaning, etching chemical cleaning and mechanical cleaning. One preferred means of effecting cleaning is the use of a mild alkaline etching chemical treatment. A suitable material for such purposes is tetrasodium pyrophosphate which is preferably employed at elevated temperatures. After cleaning has been accomplished, the exterior surfaces are rinsed, preferably with water, in order to remove any residual cleaning material, oxides and adhered foreign material.

In order to establish the reaction product coating of this invention, an aqueous solution of an alkali metal silicate having a concentration of greater than 0.5 percent is applied to the cleaned aluminum rod for a period of about 5 seconds to 10 minutes at a temperature of about 140° to 212°F. This results in establishment of a relatively thin oxidation resisting reacted silicate coating such that the outermost 1,000 angstroms of surface of the aluminum rod has at least 0.10 percent silicon. In obtaining this concentration measurement for the extremely thin reacted coating, it should be noted that the coating is too thin to be readily stripped for weight determination. It is, however, possible to determine surface silicon by means of an electron microprobe which penetrates the surface coating and possibly penetrates somewhat into the surface of the aluminum rod. This penetration causes X-rays to be emitted from the coating and the intensity of the X-ray wave length for silicon is directly related to and indicative of the silicon concentration. While the practical upper limit of concentration of the silicate is the water solubility of the silicate, highly concentrated solutions tend to result in difficulty in rinsing, an undesirably high drag-out or removal of the material from solution by the product being treated and resultant waste of material. It is, therefore, preferred that the concentration of the silicate be about 0.5 to 10 percent. Although higher concentrations will function effectively, it generally will be economically beneficial to remain within the preferred range. In general, the silicon concentration in the outermost 1,000 angstroms of surface should not exceed about 1.25 percent. In a preferred form of the invention the silicon concentration will be about 0.50 to 0.80 percent. A period of application of the aqeuous solution of at least 5 seconds is required. As the solution does not etch the metal surface appreciably or produce a material change in reacted coating, the prime consideration in selecting a maximum period of time will be economic, as no appreciable added benefits are obtained after a time period of about 10 minutes. The preferred period of application is about 30 seconds to 2 minutes.

With respect to temperature of the solution, a minimum of about 140°F is required in order to provide an appropriate reacted coating. The upper limit of temperature would be about 212°F as the solution would begin to boil at about that point. It is preferred that the solution be provided at a temperature of about 170° to 190°F.

In general, it is preferred to apply the aqueous solution to the cleaned aluminum rod by immersing the rod in a bath of the aqueous solution. While other methods, such as spraying, can be employed if desired, immersion remains the preferred method as it tends to contribute to greater uniformity and continuity of the coating.

Among the preferred alkali metal silicates for use in the aqueous solution of this invention are sodium silicate, potassium silicate and lithium silicate. A specifically preferred material is sodium silicate having an $SiO_2$ to $Na_2O$ ratio of about 2:1 to 3.75:1.

After creating the corrosion resistant reacted silicate coating, the aluminum rod is subjected to a rinse, preferably with water, in order to remove any excess aqueous solution therefrom. The aluminum rod is then dried. It is found that the resultant product has a thin reacted silicate coating which suppresses oxidation growth on the surface of the aluminum rod even after extended storage periods in adverse environments. The coating is uniform and continuous. The thin reacted film is characterized by a relatively high aluminum content and a relatively low silicon and oxygen content. It will generally be substantially devoid of the alkali metal. It possesses a desirable low electrical resistance on the order of 250 microhms and generally within the range of about 200 to 1,500 microhms as measured between 0.5 inch copper electrodes at 1,000 pounds pressure by means of a Kelvin bridge. Also, the reacted silicate coating permits the natural bright finish of the aluminum to be readily observed and preserved during extended storage. The reacted coating is such that it will withstand flexing, bending and forming of the aluminum rod without appreciable crazing or flaking.

EXAMPLE

In order to verify the effectiveness of the process of this invention comparative tests were performed. Two consumable aluminum electrodes of the type used in inert-gas metal-arc welding were provided. The electrodes were composed of 5356 alloy, which is a standard alloy conventionally employed in such uses, and were of one-sixteenth inch in diameter. One electrode was cleaned for 15 seconds in a 50 gram/liter solution of tetrasodium pyrophosphate at 180°F. This electrode was subsequently subjected to a water rinse to remove loose particles of oxide and foreign materials. This electrode was then treated with a 70 milliliter/liter solution of sodium disilicate, sold under the trade designation "DuPont 26," at 180°F for 60 seconds. The electrode was then subjected to a water rinse and dried. The second electrode was not treated. These two electrodes were then subjected to an environment maintained at 90 percent relative humidity at 100°F for a period of twelve weeks, in order to simulate severe storage conditions. After the twelve week exposure, the second electrode showed readily visible evidence of spotting on the surface which was indicative of undesired oxidation. The first electrode which had been treated remained uniformly bright. These two welding electrodes together with a third electrode, which was not exposed to the adverse storage conditions, were used to prepare surface weld bead specimens by inert-gas metal-arc welding. Radiographic examination showed definite evidence of porosity at the beginning of each of the welds created with the second electrode. No porosity was evident in the welds applied with the first and third electrodes. This clearly shows the effectiveness of the reacted silicate coating of this invention in withstanding severe environmental conditions during extended storage while performing in a fashion equal to that of a fresh unexposed welding electrode.

The welding rod produced by the process of this invention has an elongated body of substantially solid cross sectional configuration. A reacted oxidation barrier coating on the exterior surface of the elongated body is such that the outermost 1,000 angstroms of surface of the welding rod contains at least 0.10 percent silicon. The reacted coating will have a silicon content of less than about 1.25 percent. The preferred silicon content is about 0.50 to 0.80 percent.

The process and product of this invention may be employed with a wide range of aluminum alloys. It is particularly suitable for those alloys conventionally employed in the manufacture of aluminum electrodes and aluminum filler rods. Alloys frequently used in the manufacture of aluminum filler rods and electrodes are wrought alloys designated by the Aluminum Association (New York, N. Y.) and commonly known as 1100, 1260, 2319, 4043, 4047, 4145, 5039, 5154, 5356, 5554, 5556 and 5654, as well as casting alloys 319, 355 and 356.

It will, therefore, be appreciated that the process of this invention establishes a reacted silicate coating on an aluminum welding rod which coating is stable, resists oxidation and resists absorption of water and other foreign materials potentially deleterious to the welding operation and the resulting product. In addition, the tenaciously bonded reacted silicate coating is uniform and continuous. It also resists crazing and flaking responsive to flexing, bending and forming of the welding rod. The coating has a relatively low electrical resistance and permits full visual exposure of the bright aluminum surface. All of these properties are maintained during long storage under a wide variety of potentially troublesome environmental conditions. Finally, the reaction coating of this invention may be readily and rapidly created in an economical fashion by the product manufacturer. This eliminates the need for oxidation removal and other substantial pretreatment on the part of the end user performing the welding operation.

Whereas particular embodiments of the invention have been described above for purposes of illustration, it will be evident to those skilled in the art that numerous variations of the details may be made without departing from the invention as defined in the appended claims.

We claim:
1. A method of manufacturing a welding rod comprising
   providing an elongated aluminum rod,
   cleaning the surface of said aluminum rod,
   applying to said cleaned aluminum rod surface an aqueous solution of an alkali metal silicate having a concentration greater than 0.5 percent for a period of greater than 5 seconds at a temperature of about 140° to 212°F to establish an oxidation resistant reacted silicate coating on said aluminum rod surface,
   rinsing said silicate coated aluminum rod, and
   drying said silicate coated aluminum rod.
2. The method of claim 1 including providing said aqueous solution with a material selected from the group consisting of sodium silicate, potassium silicate and lithium silicate, and establishing said reacted silicate coating of such a thickness that the outermost 1,000 angstroms of said aluminum rod surface has at least 0.10 percent silicon.

3. The method of claim 2 including applying said aqueous solution to said aluminum rod by immersion of said aluminum rod in said alkali metal silicate aqueous solution.

4. The method of claim 2 including establishing said oxidation resistant reacted silicate coating of a thickness such that the outermost 1,000 angstroms of said aluminum rod surface has about 0.10 to 1.25 percent silicon.

5. The method of claim 2 including treating said aluminum rod with an aqueous solution of sodium silicate having an $SiO_2$ to $Na_2O$ ratio of about 2:1 to 3.75:1.

6. The method of claim 4 including applying said aqueous solution to said aluminum rod at a temperature of about 170° to 190°F for a period of about 30 seconds to 2 minutes.

7. The method of claim 5 including rinsing said cleaned aluminum rod surface with water prior to application of said aqueous solution, and establishing said oxidation resistant reacted silicate coating of a thickness such that the outermost 1,000 angstroms of said aluminum rod surface has about 0.50 to 0.80 percent silicon.

8. The method of claim 7 including subsequent to rinsing and drying said reacted silicate coated aluminum rod employing said aluminum rod as a consumable welding electrode in an inert-gas metal-arc welding operation to form a weld characterized by a substantial absence of porosity.

9. The method of claim 7 including subsequent to rinsing and drying said reacted silicate coated aluminum rod employing said aluminum rod as a filler rod in an inert-gas tungsten-arc welding operation to form a weld characterized by a substantial absence of porosity.

10. An aluminum welding rod comprising an elongated body of substantially solid cross sectional configuration, a reacted oxidation barrier coating on the exterior surface of said elongated body, and said oxidation barrier coating being such that the outermost 1,000 angstroms of said coated surface contains at least 0.10 percent silicon.

11. The welding rod of claim 10 including said reacted oxidation barrier coating being such that the outermost 1,000 angstroms of said coated surface contains about 0.10 to 1.25 percent silicon.

12. The welding rod of claim 11 including said reacted coating being substantially continuous and of substantially uniform thickness, and said coating being the reaction product of the application of an alkali metal silicate aqueous solution to the outer surface of said aluminum rod in order to establish a reacted coating substantially devoid of alkali metal and having the outermost 1,000 angstroms of the coated rod surface containing about 0.50 to 0.80 percent silicon and said reacted coating is characterized by resistance to appreciable crazing and flaking responsive to deformation of said aluminum rod.

13. A method of manufacturing a welding rod capable of producing welds characterized by a substantial absence of porosity comprising:

a. providing an elongated aluminum rod;

b. cleaning the surface of said aluminum rod with an alkaline etch treatment;

c. rinsing said cleaned aluminum rod surface with water;

d. applying to said cleaned and rinsed aluminum surface an aqueous solution of an alkali metal silicate having a concentration greater than 0.5 percent for a period of greater than 5 seconds at a temperature of about 140° to 212°F to establish an oxidation resistant reacted silicate coating on said aluminum rod surface;

e. rinsing said silicate coated aluminum rod to remove any excess aqueous alkali metal silicate thereon leaving a thin reacted silicate coating thereon substantially devoid of alkali metal; and f. drying said reacted silicate coated aluminum rod.

* * * * *